United States Patent Office 3,298,926
Patented Jan. 17, 1967

3,298,926
PROCESS FOR THE PRODUCTION OF
GLUCOAMYLASE
Lester E. Baribo, Syracuse, N.Y., assignor to A. E. Staley
Manufacturing Company, Decatur, Ill., a corporation
of Delaware
No Drawing. Filed Sept. 21, 1964, Ser. No. 398,043
4 Claims. (Cl. 195—66)

This invention relates to the production of glucoamylase. More particularly, it relates to the production of glucoamylase by the fermentation of nutrient fermentation media with new mutant strains of *Aspergillus phoenicis.*

Glucoamylase is a class of starch saccharifying enzyme which is characterized by the ability to digest starch to dextrose without significant formation of intermediate conversion products such as maltose, maltotriose, and dextrins. The enzyme is also referred to as "amyloglucosidase" and as "glucamylase." However, the term glucoamylase is preferred. The enzyme is produced by fermentation in nutrient media with a wide variety of microorganisms, most prominent of which are of the Aspergillus, Rhizopus, Mucor, Endomyces and Clostridium genera.

Large quantities of glucoamylase are required in the commercial production of dextrose and high dextrose content syrups. Thus a large amount of fermentor capacity is needed to produce the glucoamylase. The dextrose producing ability (usually referred to as the "potency" or the "activity") of glucoamylase preparations obtained by fermentation with available glucoamylase producing organisms varies over a wide range. Glucoamylase preparations obtained by fermentation with a strain of organism classified as *Aspergillus phoenicis* ATCC 13157 are of high potency when compared with preparations obtained from other known glucoamylase producing organisms. This organism and its use in the production of glucoamylase preparations are described in U.S. Patent 2,881,115.

Despite the high potency of glucoamylase preparations obtained with *Aspergillus phoenicis* ATCC 13157, the need to further increase the potency of glucoamylase preparations is well recognized and much work is being devoted to accomplish that result.

Accordingly, an object of this invention is to provide a novel process for producing glucoamylase preparations of increased potency.

A further object of this invention is to provide improved glucoamylase enzyme preparations for use in converting starch to dextrose.

Other objects and advantages of this invention will be apparent from the description which follows.

The foregoing objects are accomplished by fermentation in nutrient media with new and distinct mutants of *Aspergillus phoenicis* ATCC 13157 which are hereinafter designated as *Aspergillus phoenicis* Staley 298–115 (ATCC 15556) and *Aspergillus phoenicis* Staley 298–150 (ATCC 15555). By the use of these new mutants glucoamylase preparations are obtained which are much higher in potency that those obtained under the same conditions with *Aspergillus phoenicis* 298.3 ATCC 13157.

These new mutants were obtained by subjecting spores of mutants of *Aspergillus phoenicis* ATCC 13157 to ultraviolet irradiation. Cultures of the new mutants were deposited with the American Type Culture Collection, Washington, D.C., on August 3, 1964, and were assigned the following numbers: 15555 and 15556.

The new mutants may be tested for capacity to produce glucoamylase by the following procedure.

An aqueous spore suspension of the mutant to be tested is added to a sterilized nutrient medium having the following composition:

|  | Percent |
|---|---|
| Ground yellow dent corn | 2 |
| Starch | 0.5 |
| $(NH_4)_2HPO_4$ | 0.7 |
| Water, to volume. |  |
| $H_2SO_4$, to pH 6.0. |  | and the medium is then incubated at 37° C. for 24 hours on a rotary shaker. Ten milliliters of the incubated medium is then added to a flask containing a sterilized nutrient medium having the following composition:

|  | Percent |
|---|---|
| Alpha amylase thinned ground yellow dent corn | 15 |
| Corn steep liquor solids | 4 |
| Alpha amylase thinned corn starch | 3.16 |
| Water, to volume. |  |
| NaOH, to pH 6.0. |  | and the medium is incubated at 37–39° C. for 12 days on a rotary shaker. After incubation the original volume of the medium in the flask is restored by the addition of water. The contents of the flask are then filtered and the filtrate is assayed to determine its potency. The assay procedure described in U.S. Patent 2,881,115 may be utilized to determine the potency of the enzyme preparation. The potency is expressed in units per milliliter and one unit is taken as that amount of enzyme preparation required to digest 0.1 gram of starch essentially to dextrose in 48 hours at a pH of 4.0 and at a temperature of 55° C.

When fermentations were conducted as described above with *Aspergillus phoenicis* ATCC 13157 the glucoamylase activity was approximately 180 units per milliliter. With the new mutant *Aspergillus phoenicis* Staley 298–155 (ATCC 15556), the activity was approximately 360 units per milliliter. With the new mutant *Aspergillus phoenicis* Staley 298–150 (ATCC 15555), the activity was approximately 260 units per milliliter.

The new mutants are morphologically similar to each other and to *Aspergillus phoenicis* ATCC 13157. The new mutants are classified as physiological mutants rather than morphological mutants in that they differ from *Aspergillus phoenicis* ATCC 13157 and from each other principally in the ability to produce glucoamylase preparations of increased potency, although there are certain morphological distinctions. The morphological and cultural characteristics of *Aspergillus phoenicis* ATCC 13157 and the new mutants are presented in Table I.

Table I

| Characteristics | ATCC 13157 | ATCC 15555 | ATCC 15556 |
| --- | --- | --- | --- |
| Four-day starch-mineral salts-agar colony size diameter at 30° C. (millimeters). | 58-60 | 42-49 | 47-52 |
| Conidia color | (1) | (1) | (1) |
| Conidiophore length (microns) | 1,195-3,115 | 1,015-2,226 | 877-1,919 |
| Conidia diameter (microns) | 3.2-4.7 | 4.1-5.4 | 3.7-4.7 |
| Conidiophore width (microns) | 9-22 | 13-21 | 11-21 |
| Primary sterigmata length (microns) | 20.1-48.1 | 11.8-29.7 | 25.8-36.3 |
| Primary sterigmata width (microns) | 5.2-9.6 | 5.7-8.3 | 7.4-7.9 |
| Secondary sterigmata length (microns) | 7.4-10.8 | 5.7-9.6 | 7.0-11.4 |
| Secondary sterigmata width (microns) | 3.5-4.4 | 4.8-5.2 | (2) |
| Sclerotia | None | None | None |
| Perithecia | None | None | None |
| Ascospores | None | None | None |
| Head diameter (microns) | 226-351 | 152-250 | 277-378 |
| Vesicle diameter (microns) | 50-103 | 61-80 | 52-98 |

[1] Purple-brown.
[2] Not measured.

Cultures of the new mutants are preserved in the usual manner under refrigeration, for example, on slants made from the following starch-mineral salts-agar medium:

|  | Percent |
| --- | --- |
| Corn starch | 3 |
| $NaNO_3$ | 0.3 |
| $K_2HPO_4$ | 0.1 |
| $MgSO_4 \cdot H_2O$ | 0.005 |
| $FeSO_4 \cdot H_2O$ | 0.001 |
| KCl | 0.05 |
| Agar | 1.5 |
| Water, to volume. | |

My new process for the production of glucoamylase comprises fermenting a culture of Aspergillus phoenicis selected from the group consisting of Aspergillus phoenicis Staley 298-150 (ATCC 15555) and Aspergillus phoenicis Staley 298-155 (ATCC 15556) in a nutrient fermentation medium containing assimilable sources of nitrogen, carbon and nutrient minerals.

Sources of carbon which are suitable for this purpose include carbohydrate sources such as ground yellow dent corn, ground white corn, potatoes, starch, sucrose, corn syrup, ground oats, barley, wheat and the like. The nitrogen source can be in the organic or inorganic form and may be, for example, corn, oats, barley, wheat, urea, ammonium salts such as ammonium chloride, ammonium phosphate, and ammonium sulfate, peptone, corn steep liquor, wheat-bran extracts and the like. Mineral salts such as magnesium sulfate and dipotassium phosphate are used with desirable results.

The media are preferably maintained at a pH of from 3 to 7 during the fermentation which is ordinarily completed in a matter of 5 to 18 days when conducted under aeration-agitation or shaking conditions.

At the completion of the fermentation the glucoamylase preparation is filtered to remove the mycelium. If desired, the enzyme preparation may be refined to remove interfering enzymes, such as transglucosylase, as for example by absorption, or by precipitation, or the glucoamylase can be precipitated with lower alcohols such as isopropanol or ethanol.

The enzyme may be used to hydrolyze starch to dextrose. Typically, in hydrolyzing starch to dextrose the slurry of starch is first partially hydrolyzed with acid or a starch-thinning enzyme (alpha amylase) to thin starch and the hydrolysis is completed with glucoamylase.

The following examples are given for the purposes of illustration only and are not intended to limit the invention.

EXAMPLE 1

To demonstrate the effectiveness of new mutant strains Aspergillus phoenicis Staley 298-150 (ATCC 15555) and Aspergillus phoenicis Staley 298-155 (ATCC 15556) in the production of glucoamylase, shaken flask fermentations were conducted using the two new mutant strains and Aspergillus phoenicis ATCC 13157. The following procedure was utilized.

A suspension of spores from a mineral-salts starch-agar slant was transferred to a 500 milliliter De Long flask containing 200 milliliters of sterilized medium having the following composition:

|  | Percent |
| --- | --- |
| Ground yellow dent corn | 2 |
| Corn starch | 0.5 |
| Diammonium phosphate | 0.7 |
| Water, to volume. | |
| NaOH, to pH 6.0. | |

The inoculated flask was then incubated at 38° C. for 24 hours on a gyrorotary shaker at 220 r.p.m. At the completion of the 24-hour period 6 flasks, each flask containing 100 milliliters of sterilized medium of the following composition:

|  | Percent |
| --- | --- |
| Alpha amylase thinned ground yellow dent corn | 15 |
| Corn steep liquor solids | 3 |
| Alpha amylase thinned corn starch | 4 |
| Water, to volume. | |
| NaOH, to pH 6.0. | | were each inoculated with 5 milliliters of the 24-hour inoculum culture from the De Long flask. The six flasks were then capped with Morton stainless steel closures and the contents of the flasks were incubated for 12 days at 38° C. on the gyrorotary shaker at 220 r.p.m.

At the end of the 12-day period each culture was filtered through filter paper and each filtrate was assayed for glucoamylase activity. The results obtained are shown in Table II.

Table II

| Culture | ATCC 13157 | ATCC 15556 | ATCC 15555 |
| --- | --- | --- | --- |
| Average yield of glucoamylase units per ml. of six culture filtrates | 178 | 459 | 349 |

The results show that the activity of enzyme preparations obtained by the use of Aspergillus phoenicis Staley 298-155 (ATCC 15556) and Aspergillus phoenicis 298-150 (ATCC 15555) is much higher than preparations obtained by the use of Aspergillus phoenicis ATCC 13157.

EXAMPLE 2

This example shows the production of glucoamylase in a large size fermentor using Aspergillus phoenicis Staley 298-155 (ATCC 15556).

Into a 200 gallon fermentor equipped for agitation and aeration were placed 160 gallons of medium of the following composition:

| | Percent |
|---|---|
| Ground yellow dent corn | 15 |
| Corn starch | 3.16 |
| Corn steep solids | 2.86 |
| Water, to volume. | |

The medium had a density of 8.8 pounds per gallon and a pH of 5.6. The medium was sterilized by heating at about 120° C. The medium was cooled to 38° C. and then inoculated with 1% by volume of a 24 hours' inoculum of *Aspergillus phoenicis* Staley 298–155 (ATCC 15556). Agitation was supplied and the medium was aerated using 12.8 cubic feet of air per gallon per minute. After 7 days of fermentation at 38° C. the medium was found to have a glucoamylase activity of 420 units per milliliter.

EXAMPLE 3

This example shows the production of glucoamylase in a large size fermentor using *Aspergillus phoenicis* Staley 298–150 (ATCC 15555).

Into a 200 gallon fermentor equipped for agitation and aeration were placed 160 gallons of medium of the following composition:

| | Percent |
|---|---|
| Ground yellow dent corn | 15 |
| Corn starch | 3.16 |
| Corn steep solids | 2.86 |
| Water, to volume. | |

The medium had a density of 8.8 pounds per gallon and a pH of 5.4. The medium was sterilized by heating to about 120° C. The medium was cooled to 38° C. and then inoculated with 1% by volume of a 24-hour inoculum of *Aspergillus phoenicis* Staley 298–150 (ATCC 15555). Agitation was supplied and the medium was aerated using 12.8 cubic feet of air per gallon per minute. After 7 days of fermentation at 38° C. the medium was found to have a glucoamylase activity of 260 units per milliliter.

Since many embodiments may be made of this invention and since many changes may be made in the embodiments described, the foregoing description is to be interpreted as illustrative only and the invention is defined in the appended claims.

I claim:

1. A process for the production of glucoamylase which comprises fermenting in a nutrient medium an organism selected from the group consisting of *Aspergillus phoenicis* Staley 298–150 (ATCC 15555), and *Aspergillus phoenicis* Staley 298–155 (ATCC 15556).

2. A process for the production of dextrose which comprises fermenting in a nutrient medium containing an organism selected from the group consisting of *Aspergillus phoenicis* Staley 298–150 (ATCC 15555) and *Aspergillus phoenicis* Staley 298–155 (ATCC 15556) and using the resulting glucoamylase to digest starch to dextrose.

3. The process of claim 2 wherein the nutrient medium contains assimilable sources of carbon, nitrogen and nutrient minerals.

4. A process for the hydrolysis of starch to dextrose which comprises initially, partially hydrolyzing an aqueous starch suspension to thin the said starch and thereafter completing the hydrolysis by subjecting it to the action of enzyme preparation produced in accordance with claim 1.

References Cited by the Examiner

UNITED STATES PATENTS

| 2,893,921 | 7/1959 | Langlois et al. | 195—66 |
| 3,012,944 | 12/1961 | Armbruster | 195—31 |

A. LOUIS MONACELL, *Primary Examiner.*

L. M. SHAPIRO, *Assistant Examiner.*